July 25, 1967 F. M. WOOD ETAL 3,332,278
ULTRASONIC FLAW DETECTION
Filed July 15, 1963 3 Sheets-Sheet 1

INVENTORS
Fenton M. Wood &
Noel B. Proctor

BY Arnold, Roylance & Harris

ATTORNEYS

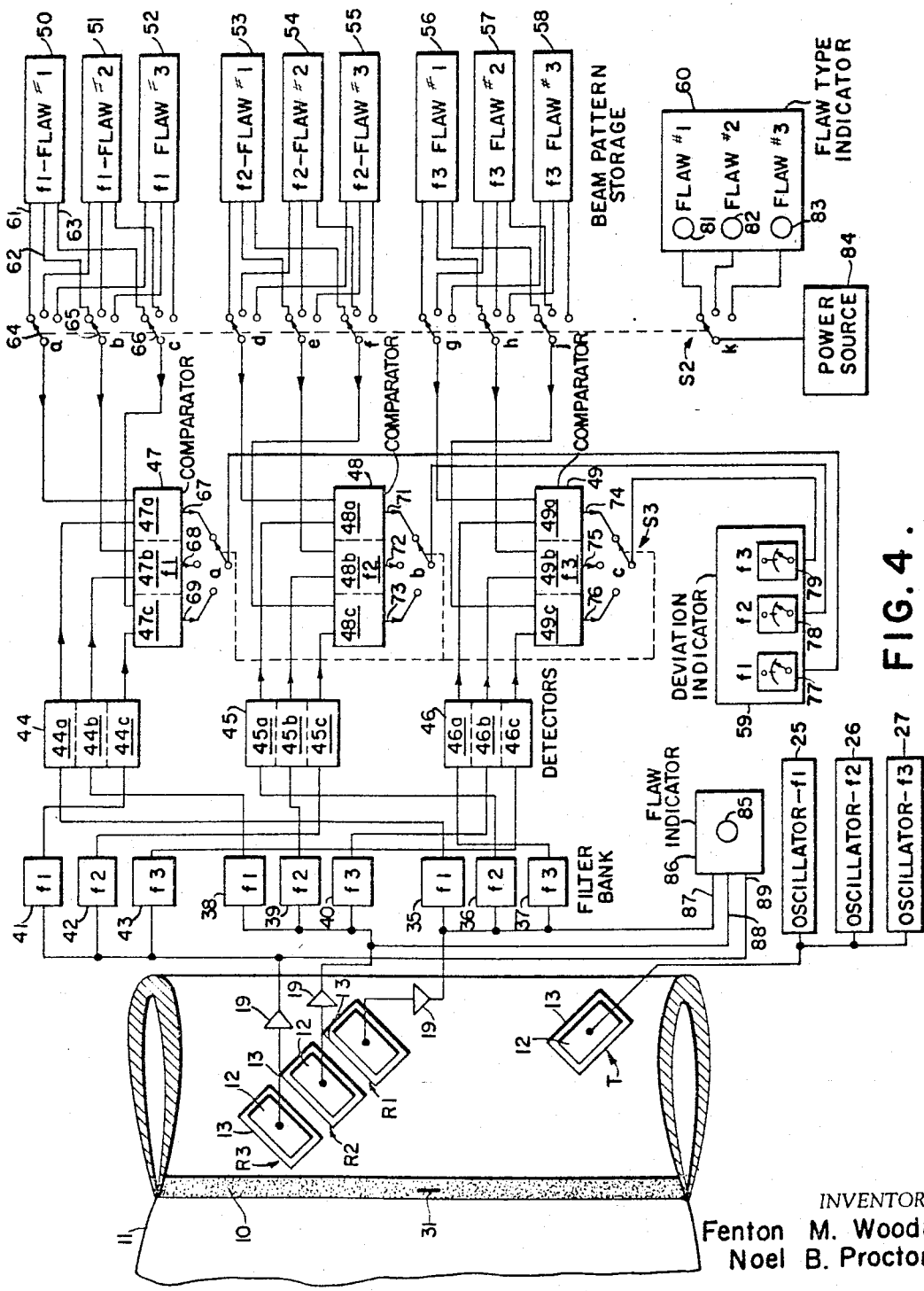

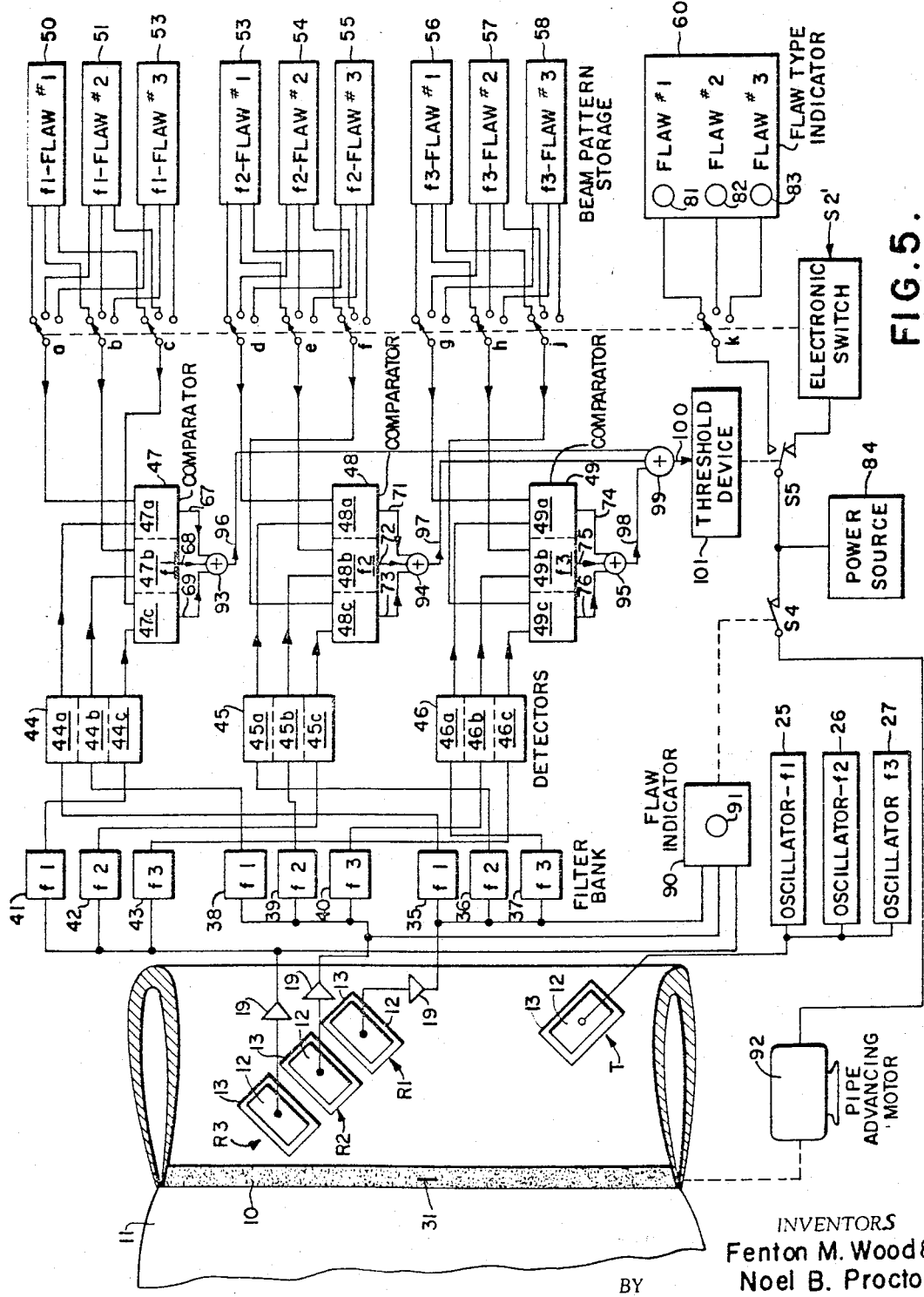

United States Patent Office 3,332,278
Patented July 25, 1967

3,332,278
ULTRASONIC FLAW DETECTION
Fenton M. Wood, Sugarland, and Noel B. Proctor, Houston, Tex., assignors, by mesne assignments, to American Machine & Foundry Company, New York, N.Y., a corporation of New Jersey
Filed July 15, 1963, Ser. No. 295,074
29 Claims. (Cl. 73—67.7)

This invention relates to flaw detection by means of ultrasonic compressional waves and more particularly to means for determining the configuration of flaws so detected.

Conventional techniques for the detection of flaws by means of ultrasonic waves are designed to provide information only as to the existence and location of the flaws, and do not provide any indication of their size or configuration. An inspection system which would provide such information would be extremely useful. Frequently, flaws of a certain type are perfectly acceptable, and considerable waste results from the rejection of acceptable parts because the inspection system is unable to discriminate between acceptable and non-acceptable flaws or discontinuities.

As an example of this situation, in the inspection of longitudinal welds in metallic pipe, a crack is not acceptable and a section of the pipe containing a crack in the weld must be removed. An inclusion in the weld, however, is quite often acceptable. However, ultrasonic methods currently used for pipe weld inspection are unable to differentiate between cracks and inclusions, resulting in a waste of pipe and of time in removing usable pipe segments containing weld inclusions.

It is an object of this invention to provide a method of and apparatus for ultrasonic inspection of solid parts by which the characteristics of a flaw may be determined.

Even where information as to the character of the flaw is available in currently used systems, it normally only indicates the gross size of the flaw. This information is obtained from a measure of the magnitude of the flaw-indicating signal: thus, a large amplitude signal indicates a relatively large flaw, and vice versa.

It is therefore another object of this invention to provide a method of and apparatus for determining flaw characteristics which are adapted to provide extremely detailed and precise information as to the nature of the flaw.

It is a still further object of this invention to provide such a method and apparatus which are highly versatile; being adaptable to implementation very simply and inexpensively to provide a rough indication of flaw characteristics, and also being adaptable to provide instantaneous and detailed flaw information in a rapidly moving, mass production, inspection system.

These and other objects of this invention are achieved broadly by utilizing a continuous wave transmission of carefully controlled known frequency, and determining the beam pattern characteristics of that portion of the transmitted wave which is reflected from a flaw. For otherwise identical testing conditions, a reflected beam pattern of unique characteristics results for each combination of a particular flaw configuration and a particular frequency of the wave incident upon the flaw.

According to this invention, the region in which the flaw is suspected may be interrogated by a single frequency wave, interrogated sequentially by a succession of single frequency waves of differing frequencies, or interrogated by a single wave comprising a plurality of superimposed frequencies. In the latter case the reflected beam is separated into its frequency components after reception, and the characteristics of each separate beam pattern corresponding to each component frequency are obtained. The beam pattern, or beam patterns (one pattern corresponding to each interrogating frequency) obtained for a particular flaw of unknown configuration may be compared with similar patterns obtained with flaws of known configurations with the same frequencies and testing conditions. The comparison may be visual, or more sophisticated comparison means may be used, whereby the detected beam patterns are automatically electronically compared to the stored beam patterns of known flaws. The more detailed the beam pattern information obtained (normally depending upon the number of receiving transducers used), and the greater the number of interrogating frequencies used for a particular flaw, the more precisely the flaw characteristics may be determined.

The manner in which the method and apparatus of this invention fulfill the above and other objectives may be more clearly understood by reference to the following detailed description taken in conjunction with the drawings, which form a part of the specification, and in which.

FIG. 4 is a partial plan view and partial block diagram of another embodiment of this invention in a system for locating and determining the characteristics of a flaw in which the interrogating continuous ultrasonic wave comprises a plurality of superimposed frequencies and in which the resulting beam patterns of the component reflected waves are compared electrically with stored information as to the corresponding beam patterns of flaws of known configurations; and FIG. 5 is a partial plan view and partial block diagram of an embodiment of this invention similar to that shown in FIG. 4, but in which modifications in the circuitry enable the beam pattern comparisons to be made more rapidly.

Figure 1:
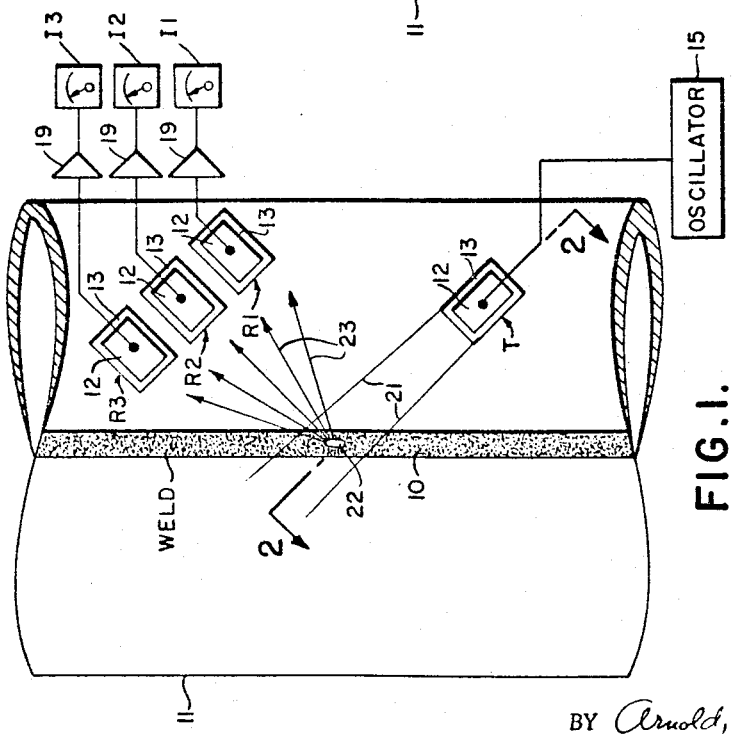
FIG. 1 is a partial plan view and partial block diagram of an embodiment of this invention using single frequency, continuous wave, ultrasonic energy for locating and determining the characteristics of a flaw in a longitudinal pipe weld.
Figure 2:
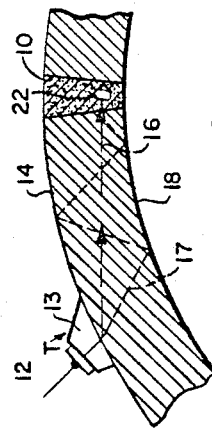
FIG. 2 is a section taken along line 2—2 of FIG. 1.

FIGS. 1 and 2 illustrate one embodiment of this invention in a system for locating and determining the characteristics of flaws in a longitudinal weld 10 in a metal pipe 11. The system utilizes a transmitting transducer T and three receiving transducers R1, R2, R3. The outputs of receiving transducers R1, R2 and R3 are connected through identical amplifiers 19 of conventional design to indicating meters I1, I2 and I3, respectively. Each of the four transducers comprises a transducing element 12, which may conveniently be a quartz piezoelectric crystal, and a wedge 13 for angular coupling of ultrasonic energy between transducing element 12 and the outer convex surface 14 of pipe 11. The use of such wedges in connection with transducing elements for coupling ultrasonic energy into and out of a surface at angles other than normal to the surface is well known and is described, for instance, in U.S. Patent 2,527,986 to Benson Carlin. The wedges 13 may be of any material suitable for coupling ultrasonic energy between the particular transducing elements used and the particular metal of which pipe 11 is constructed.

Continuous wave electrical signals at an ultrasonic frequency are generated by constant frequency oscillator 15 and applied to transducing element 12 of transmitting transducer T. The transducing element transforms the electrical signals into compressional waves at the same frequency and transmits them via coupling wedge 13 and interface 14 into pipe 11.

Wedge 13 of transmitting transducer T may be of any appropriate configuration to produce ultrasonic compressional waves in either the longitudinal or shear mode which travel through the solid portion of pipe 11 and interrogate weld 10. As shown in the section of FIG. 2, wedge 13 may be conveniently configured so that longitudinal waves 16 are transmitted into pipe 11 and follow a straight line chordal path to weld 10. Shear waves 17 have an angle of refraction which is considerably less than that of the longitudinal waves and, as shown by dotted line 17, are reflected from the inner concave surface 18 of pipe 11 and are subsequently repeatedly reflected back and forth between surfaces 14 and 18 and substantially dissipated before reaching any of the receiving transducers. The energy reaching receiving transducers R1, R2 and R3 will then comprise solely longitudinal waves 16 which have been reflected from any flaw occurring in weld 10. This method of longitudinal wave transmission is described in a copending application by the same inventors, Ser. No. 273,101, filed April 15, 1963, now Patent No. 3,302,453, which may be referred to for more detailed information. The use of this particular mode of transmission is not essential to the practice of this invention, and the flaw-interrogating beam may be of either the longitudinal or shear mode, or both.

The beam of energy transmitted from transducer T is indicated in FIG. 1 by lines 21 defining the beam width for some arbitrarily established decrement level, as for instance, where the beam energy is down 3 db from its maximum energy. This beam will intersect and pass through weld 10 and the presence of a flaw in the weld will be indicated by a portion of the beam which will be reflected from the flaw toward receiving transducers R1, R2 and R3.

It is with the nature of this reflected beam, specifically its beam pattern, that we are concerned in this invention. The beam pattern of ultrasonic wave reflected from a flaw will be dependent upon both the frequency composition of the wave and the configuration of the reflecting flaw interface.

For a single frequency continuous wave interrogating beam, variations in the beam pattern of the reflected energy will be a function of the configuration of the flaw. Thus, for a relatively flat flaw interface, such as produced by a crack, the reflected energy will be in the form of a relatively narrow beam; for an inclusion, presenting a generally convex interface of the interrogating beam, the reflected energy will be scattered widely. Such a situation is shown in FIG. 1, where the flaw in weld 10 is shown to be an inclusion 22. Energy reflected from inclusion 22 is widely dispersed as indicated by lines 23 radiating therefrom. Since this reflected energy radiates with substantially equal energy throughout a relatively wide angle as indicated by lines 23, receiving transducers R1, R2 and R3, spaced in a line across the expected path of flaw-reflected energy, will each receive an approximately equal amount of energy. The electrical signals coupled from each of transducers R1, R2 and R3 through amplifiers 19, to their respective indicators I1, I2 and I3, will be substantially equal. I1, I2 and I3 are shown in FIG. 1 as meters, they could of course be any indicating device adapted to provide a representation of the amplitude of electrical signal input.

A substantially equal indication on the meters, then, describes a widely scattered beam and indicates an inclusion type flaw. Since an inclusion is frequently acceptable in welded metal pipe, such an indication prevents unnecessary removal of an acceptable section of pipe. A crack along the axis of weld 10 would result in a reflected beam of much narrower configuration, resulting in more energy reaching central receiving transducer R2 than reaches either R1 or R3 flanking it, and resulting in a higher indication on meter I1 than on either of meters I1 or I3.

The use of visual indicators, such as the meters shown in FIG. 1, provides a rough indication of the configuration of the flaw, and in certain situations, such as where any flaw occurring is expected to be one of only two types, such a rough indication is sufficient. The beam pattern information obtained from the receiving transducers may be used to obtain more precise information as to the configuration of an unknown flaw by comparing this information with beam pattern information obtained from flaws of known configurations under the same circumstances, i.e., the same geometrical testing configuration and the same frequency of interrogating beam. This comparison may be made visually or electronically, and some typical methods of comparison are described below.

More detailed information concerning the nature of the flaw may be obtained by using a larger number of receiving transducers, which, of course, results in more precise definition of the beam pattern characteristics; and also by interrogating the weld with beams of more than one frequency, and obtaining beam pattern information corresponding to each interrogating beam of each separate frequency.

Figure 3:
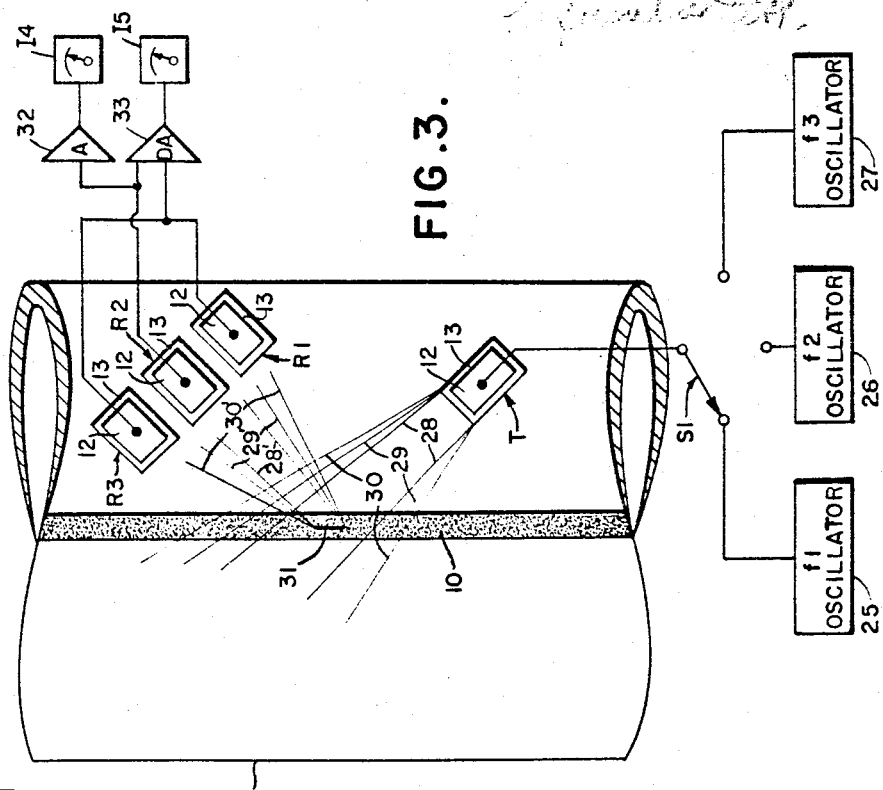
FIG. 3 is a partial plan view and partial block diagram showing another embodiment of this invention utilizing sequentially transmitted continuous ultrasonic waves of different frequencies for locating and determining the characteristics of a flaw in a longitudinal pipe weld.

Turning now to FIG. 3, there is shown a flaw detection system similar to that of the embodiment shown in FIGS. 1 and 2, but using sequentially transmitted interrogating beams of different frequencies and using a different method of presenting the flaw-reflected beam pattern information. The three oscillators 25, 26 and 27 oscillating at different frequencies $f1$, $f2$ and $f3$, respectively, are connected through a single pole, three-position switch S1 to transmitting transducer T. Switch S1 may be operated either manually or automatically to sweep through its three positions and connect the three oscillators sequentially to transducer T, providing three continuous wave interrogating beams, each having a different frequency. If $f1$ is the highest frequency, and $f3$ is the lowest, then, since the spread of an ultrasonic beam is an inverse function of its frequency, the three sequentially transmitted interrogating beams are represented by lines 28, 29 and 30 indicating the beam width of the beam at frequencies $f1$, $f2$ and $f3$, respectively. Each of these three beams will be in turn reflected from any flaw, here shown as a crack 31 appearing in weld 10.

Since the relationship between the frequency of an ultrasonic beam and its spread holds not only for waves, transducer generated, but also for reflected waves, each of the three interrogating waves reflected from crack 31 will exhibit beam spreading characteristics corresponding to its frequency. The reflected beams are indicated in FIG. 3 by lines 28′, 29′ and 30′ corresponding to interrogating beams 28, 29 and 30, respectively, and describing the width of each reflected beam in terms of some arbitrarily assigned decrement level, for instance, where the beam energy is 3 db down from the line of maximum energy.

The output of centrally located receiving transducer R2 is fed directly to the input of amplifier 32, whose output is connected to a meter or other indicating device I4. The outputs of receiving transducers R1 and R3 are connected together and to one of the inputs of differential amplifier 33. The other input of differential amplifier 33 is connected to the output of receiving transducer R2. Differential amplifier 33, as its name implies, provides an amplified indication of the difference between the signals at its two inputs, and its output is fed to meter or other indicating device I5. Meter I4, therefore, will provide an indication of the strength of the reflected beam at centrally located transducer R2, and thus provide a general indication of the over-all strength of the reflected beam; indicator I5, on the other hand, provides an indication of the nature of the beam pattern.

In the FIG. 3 configuration, reflected beam 23′ will result in a very strong signal from centrally located transducer R2, and a much weaker signal from transducers R1 and R3, since high frequency beam 28' is relatively narrow. This results in a high indication on meter I4. If the signals from transducers R1 and R3 are each one-half of the amplitude of the signal output of transducer R2, then their summing and comparison with the R2 output in differential amplifier 33 will result in a zero indication on meter I5. As the reflected beam increases in width, the outputs of transducers R1 and R3 will increase with respect to the amplitude of the R2 output, and thus the output of differential amplifier 33 as displayed on meter I5 will increase from zero. For a return scattered from an inclusion 22 as shown in FIG. 1, the outputs from all of the receiving transducers would be approximately equal, and therefore the sum of the R1 and R3 outputs would be double the R2 output and the output of differential amplifier 33 as displayed on meter I5 would be substantially equal to the output of amplifier 32 displayed on meter I4.

Obviously, the display system shown in the FIG. 3 configuration could equally well be used in FIG. 1 and the meters I1, I2 and I3 directly connected to the receiving transducers in FIG. 1 could be also used with the FIG. 3 embodiment.

It might appear that the use of sequentially transmitted beams of different frequencies would not supply any more information on the flaw configuration than would one single frequency interrogating beam, since beam spread is an inverse function of frequency. This would be the case where the reflecting surface was absolutely flat and smooth: the only difference in reflected beams of different frequencies would be the beam spread and this would be strictly a function of the beam frequency. However, flaws are never absolutely flat and smooth. There are various irregularities in the beam reflecting interface, and different interfaces have different textures; and the effect of these irregularities and differing textures on a reflected beam will differ with the frequency of that beam. Therefore the beam pattern characteristics of each of the different frequency beams reflected from the same flaw will provide additional information on the flaw configuration.

FIG. 4 shows another system for detecting flaws in a longitudinal weld 10 in a metal pipe 11 utilizing a transducer array similar to that shown in the embodiments of FIGS. 1 and 3. A single transmitting transducer T and three receiving transducers R1, R2 and R3 are disposed as in the other embodiments. In the embodiment of FIG. 4, however, the three fixed frequency oscillators 25, 26 and 27 oscillating at frequencies $f1$, $f2$ and $f3$, respectively, have their outputs connected together and to transmitting transducer T, instead of being arranged for sequential connection through a switch as in the embodiment of FIG. 3. The ultrasonic energy beam transmitted by transducer T in this configuration is not a single frequency beam as described in connection with the other embodiments, but has a waveform which comprises a combination of the three frequencies. The three oscillators preferably have equal amplitude outputs, so that the components of the transmitted ultrasonic wave corresponding to each of the three frequencies are equal.

Each of the three components of the interrogating wave may be considered separately, so that the beam may be considered as if three separate, single frequency beams were being transmitted simultaneously by transmitting transducer T. Each component will have its own characteristic beam spread and, when reflected from a flaw in weld 10, the reflected portion of each component will exhibit the beam pattern characteristics corresponding to its particular frequency. Thus, the effect of the FIG. 4 arrangement is to perform the same interrogation of a flaw 31 by three beams of separate frequencies as was done in the FIG. 3 embodiment, but to do it simultaneously rather than sequentially.

The electrical output of receiving transducer R1, after amplification in amplifier 19, is fed to the inputs of three conventional bandpass filters 35, 36 and 37, which are adapted to pass the component frequencies $f1$, $f2$ and $f3$, respectively. The output of receiving transducer R2 is correspondingly amplified in an amplifier 19 and fed to the inputs of bandpass filters 38, 39 and 40, passing frequencies $f1$, $f2$ and $f3$, respectively; and the output of receiving transducer R3 is similarly amplified and fed to bandpass filters 41, 42 and 43 passing frequencies $f1$, $f2$ and $f3$, respectively. In all three sets of filters, the filters corresponding to identical frequencies are identical. Thus, the composite electrical output of each of the receiving transducers is separated by means of the filters into its three frequency components.

After separation in the filter bank, the electrical signals representing flaw-reflected beam pattern characteristics corresponding to the $f1$, $f2$ and $f3$ beam components are converted to DC signals in detectors 44, 45 and 46, respectively, and compared in comparators 47, 48 and 49, respectively, with information on the characteristics of beam patterns of corresponding frequencies reflected under identical conditions from various flaws of known configuration, which information has been stored in a bank of beam pattern storage units 50–58. The results of this comparison are fed to deviation indicator 59, which, in conjunction with flaw type indicator 60, provides a visual presentation of the degree to which the unknown flaw matches the flaws of known characteristics whose reflected beam pattern characteristics have been stored.

To accomplish this comparison, the outputs of the various filter banks are sorted out to provide an indication of the beam pattern characteristics corresponding to each separate frequency component of the flaw-reflected wave. The outputs of filters 35, 38 and 41, all passing only frequency $f1$, are connected to channels 44a, 44b and 44c, respectively, of detector 44. Detector 44 may be of any standard configuration designed to convert an alternating current into a direct current output voltage having an amplitude which is a function of the amplitude of the AC signal input. The three channels, 44a, 44b and 44c, may be identical.

Each of the outputs of channels 44a, 44b and 44c of detector 44 are connected to one input of each of channels 47a, 47b and 47c, respectively, of $f1$ comparator 47. Similarly, the outputs of the $f2$ bandpass filters 36, 39 and 42 are fed through the three channels of detector 45 to one input of channels 48a, 48b and 48c, respectively, of $f2$ comparator 48; and the outputs of $f3$ bandpass filters 37, 40 and 43 are fed through detector 46 to one input of each of channels 49a, 49b and 49c, respectively, of $f3$ comparator 49. Detectors 45 and 46 are similar to detector 44, as described above. Comparators 48 and 49 are identical to comparator 47; the nature and function of these comparators will be described below.

The nine beam pattern storage units 50–58 each contain information as to the beam pattern characteristics of a beam of one of the three frequencies reflected from one of three different flaws of known configuration. Thus, beam pattern storage units 50, 51 and 52 contain information as to the beam pattern characteristics of a beam of frequency $f1$ reflected from Flaw No. 1, Flaw No. 2 and Flaw No. 3, respectively, obtained by using the same test configuration as is being used to detect unknown flaws. Likewise, beam pattern storage units 53, 54 and 55 contain information as to the beam frequency $f2$ reflected from Flaw No. 1, Flaw No. 2 and Flaw No. 3, respectively; and beam pattern storage units 56, 57 and 58 contain information as to the beam characteristics of a beam of frequency $f3$ reflected from Flaw No. 1, Flaw No. 2 and Flaw No. 3, respectively.

Each beam pattern storage unit contains stored information for all three receiving transducers, brought out on three separate leads. Thus, on output leads 61, 62 and 63 of storage unit 50, there is available information as to the strength of the $f1$ component of the ultrasonic wave reflected from Flaw No. 1 and received at receiving transducers R1, R2 and R3, respectively. Similarly, the three leads from each of the other storage units, reading from top to bottom, provide information on the strength of the appropriate reflected ultrasonic wave components received at receiving transducers R1, R2 and R3, respectively.

The beam pattern storage units may comprise any type of storage devices in which information is stored as a voltage. Each unit might, for instance, comprise three potentiometers connected across a reference potential difference, with the adjustable arm of each potentiometer being brought to a separate one of the output leads.

Beam pattern storage units 50–58 are connected to comparators 47, 48 and 49 through nine sections of a ten section, three position switch S2. The function of the tenth section this switch will be described below.

When the arms of switch S2 are in their upper position as shown in FIG. 4, output line 61 of storage unit 50, having a voltage representative of the magnitude at receiving transducer R1 of a beam of frequency $f1$ reflected from Flaw No. 1, is connected through switch arm 64 of switch section S2a to the other input of channel 47a of $f1$ comparator 47. Similarly, with switch S2 in this position, output line 62 of storage unit 50, with a voltage corresponding to the magnitude of a wave of frequency $f1$ reflected from Flaw No. 1 and incident upon receiving transducer R2, is connected via switch arm 65 of switch section S2b to the other input of channel 47b of $f1$ comparator 47. Output line 63 of storage unit 50, carrying information as to the same $f1$ beam component reflected from Flaw No. 1 and received at receiving transducer R3, is connected via switch arm 66 of switch section S2c to the other input of channel 47c of $f1$ comparator 47. Each channel of $f1$ comparator 47, then, receives for comparison both (a) information received directly from a particular receiving transducer at frequency $f1$ and (b) similar stored information obtained from the same transducer for a particular flaw of known configuration.

The signals fed from the outputs of detector 44 to one of the inputs of each of the comparator channels in $f1$ comparator 47 are DC voltage signals, and the information stored in beam pattern storage units 50–58 is in the form of voltage parameters; therefore the comparator channels may be of any well known configuration wherein two voltages are compared and a resulting voltage of either polarity is obtained, representative of their difference. Output leads 67, 68 and 69 of $f1$ comparator channels 47a, 47b and 47c, respectively, each contain a voltage representative of difference indicated by the voltage comparison in the corresponding comparator channel.

Comparator 48, the $f2$ comparator, is connected through detector 45 to $f2$ filters 36, 39 and 42, and through switch sections S2d, S2e and S2f to $f2$ storage units 53, 54 and 55, in a manner similar to the connection of the $f1$ components to $f1$ comparator 44, described above. In a like manner, $f3$ comparator 49 is connected through detector 46 to $f3$ filters 37, 40 and 43, and through switch sections S2g, S2h and S2j, to $f3$ storage units 56, 57 and 58. Channels 48a, 48b and 48c, in which comparisons of the $f2$ frequency components at transducers R1, R2 and R3, respectively, are made, have output leads 71, 72 and 73, respectively. Similarly, channels 49a, 49b and 49c of $f3$ comparator 49, corresponding respectively to transducers R1, R2 and R3, have output leads 74, 75 and 76, respectively.

The outputs of the three comparators, containing the results of the nine comparisons in the form of voltages, are connected through three section, three position switch S3 to galvanometer-type indicating meters 77, 78 and 79 in deviation indicator 59. Since the voltage which appears at the outputs of the various comparator channels may be of either polarity, meters 77, 78 and 79 are advantageously voltage-sensitive, zero-center meters, which, by deflection in either direction from the centrally located zero position, will give an indication of both the magnitude and polarity of the input voltage. It should be noted that while galvanometer-type meters are shown, the system is in no wise restricted to use with this type of indicator. Oscilloscopes may, for instance, be used in lieu of the galvanometers to obtain more rapid response.

Output leads 67, 68 and 69 $f1$ comparator 47 are connected to the three terminals of switch section S3a, and the selected one is connected through the center arm of section S3a to meter 77, the $f1$ meter. Similarly, output leads 71, 72 and 73 of $f2$ comparator 48 are connected through S3b to $f2$ meter 78, output leads 74, 75 and 76 and $f3$ comparator 49 are connected via switch section S3c to $f3$ meter 79. The three arms of switch S3 are ganged together, and each position of S3 corresponds to a different receiving transducer. With switches S2 and S3 in the positions shown in FIG. 4, there will be displayed upon meters 77, 78 and 79 of deviation indicator 59 an indication of the differences between the $f1$, $f2$ and $f3$ components, respectively, of the reflected beam from the unknown flaw received at transducer R1, and similar stored information for transducer R1 and Flaw No. 1. As switch S3 is moved to its center and then to its left-hand positions, there will be displayed upon the meters of deviation indicator 59 indications, corresponding to transducer R2 and R3, respectively, of comparison with Flaw No. 1.

If switch S2 is then moved to its central position, and switch S3 is swept through its three positions again, analogous information will be presented on deviation indicator 59 resulting from comparison with known Flaw No. 2; and with switch S2 in its lower position, the three positions of switch S3 will result in a presentation of information resulting from comparison with Flaw No. 3.

Obviously, if the indicating needle on one of the meters remains on the zero-center position, the two voltages being compared in the appropriate comparator channel are alike in polarity and equal in amplitude; the further the needle swings to either side of the zero-center position, the greater the deviation of the received signal from the stored signal against which it is being compared. There will be presented upon meters 77, 78 and 79 a visual indication of each comparison point corresponding to: (1) a particular known flaw; (2) a particular frequency; and (3) a particular transducer. The three meters, together with the nine possible combinations of positions of the two switches, permit the results of all twenty-seven separate comparisons to be presented visually to the person making the test. The meter deviations for the nine separate comparisons possible for each position of switch S2 indicate the closeness with which the flaw of unknown configuration matches the characteristics of the particular known flaw selected by switch S2.

In order that the individual making the test may be aware, while he is moving switch S3 through its three positions, which of the three flaws of known configuration is then the subject of comparison, flaw type indicator 60 is provided. It contains three incandescent lamps 81, 82 and 83, corresponding to Flaw No. 1, Flaw No. 2 and Flaw No. 3, respectively, and is connected through switch section S2k, the tenth, and so far unused, section of switch S2, to power source 84. Switch section S2k will cause that particular incandescent lamp to be lit which corresponds to the particular known flaw which is then the subject of comparison.

In using such a system for detecting flaws in a longitudinal weld 10 in a metal pipe 11, the pipe 11 is normally moved along its axis slowly past the complex of transducers. Since a large amount of switching, as just described, is necessary to evaluate a particular discovered flaw, some means is advantageously provided for indicating the discovery of such a flaw, so that pipe 11 may be stopped and the flaw examined by the analysis system to determine its characteristics. For this reason, a flaw indicator 86 is provided. The outputs from receiving transducers R1, R2 and R3, after amplification, are fed to the input of flaw indicator 86 via leads 87, 88 and 89, respectively. An incandescent bulb 85 in flaw indicator 81 lights whenever sufficient return from either of the three receiving transducers indicates the existence of a flaw of some type. Whenever the equipment operator perceives such a flaw-indicating signal, he immediately stops the longitudinal movement of pipe 11 and performs the appropriate switching to obtain information as to how closely the discovered flaw matches any of the known flaws having information stored in the storage unit.

FIG. 5 shows a flaw detection and analysis system which is similar in basic operation to the embodiment shown in FIG. 4, but which is modified to provide automatic flaw detection and flaw comparison without the extensive manual switching necessary in the basic system of FIG. 4. The ultrasonic transducers and their arrangement with respect to pipe 11, the oscillators feeding transmitting transducer T, the amplifiers, the filter bank, the detectors, the comparators, and the beam pattern storage units are all identical in construction and operation to the units shown in FIG. 4 and bear identical designations.

Flaw indicator 90 is similar to flaw indicator 86 of FIG. 4, and is connected in an identical fashion to the outputs of the receiving transducers after amplification. An incandescent lamp 91 is adapted to light and indicate the presence of a flaw whenever the energy received on any of the three leads from the receiving transducers indicates a sufficient reflection from weld 10. Flaw indicator 90 differs from flaw indicator 86 of FIG. 4 in that, in addition to providing a visual indication of the existence of a flaw, it also controls a single pole, single throw, normally closed switch S4, as indicated by the dashed line connection. Switch S4 is connected in series between pipe-advancing motor 92, which drives pipe 11 past the array of ultrasonic transducers, and power source 84, which provides operating power for motor 92. Switch S4 remains closed, supplying power to motor 92, as long as no flaw is indicated. Upon the indication of a flaw, lamp 91 in flaw indicator 90 lights and indicator 90 opens switch S4, stopping motor 92 and halting the longitudinal movement of pipe 11.

Switch S2' is identical to switch S2 of the FIG. 4 embodiment, except that switch S2' is an electronic switch and is swept rapidly and successively through its three switch positions. Since the comparison of the discovered flaw with each of the three known flaws is performed electronically, the arms of switch S2' need rest only instantaneously on each of the three contacts, and the switching speed of S2' may be made as rapid as desired. The connections to the first nine sections (S2'a through S2'h and S2'j) of ten section switch S2' are identical to those to the first nine sections (S2a through S2h and S2j) of switch S2 of FIG. 4. The manner of feeding information to comparators 47, 48 and 49, both from the receiving transducers and from the storage bank, is identical to that of the FIG. 4 embodiment, with the exception that the storage bank information is switched more rapidly through electronic switch S2' than through manual switch S2. Comparators 47, 48 and 49 are identical in structure and operation to those in FIG. 4 embodiment and the outputs of the various channels are identical to those of FIG. 4, with the output leads in FIG. 5 being numbered in an identical fashion to those of FIG. 4.

The FIG. 5 embodiment differs from that of FIG. 4 principally in the manner in which the information resulting from the various comparisons is processed subsequent to leaving comparators 47 and 48 and 49. The output leads of the three comparators, instead of being fed to a manual switch S3, as in FIG. 4, are fed to three identical summing circuits 93, 94 and 95.

Leads 67, 68 and 69, comprising the outputs of three channels of f1 comparator 47, are fed to the three inputs of summing circuit 93. In a like manner, leads 71, 72 and 73 from f2 comparator 48 are fed to the inputs of summing circuit 94, and leads 74, 75 and 76 from f3 comparator 49 are fed to the inputs of summing circuit 95.

Summing circuits 93, 94 and 95 may be of any type, well known in the art, which produce an output voltage representative of the sum of the absolute values of the input voltages, without respect to polarity. The reason for ignoring the polarity of the input signals to the summing circuits is obvious; an algebraic summation could result in a very low output sum, indicating a very close match of the particular frequency component of the unknown flaw with the stored information, even though the individual comparisons in each of the three channels indicated wide variations, with the positive variations substantially cancelling out the negative variations.

The output leads 96, 97 and 98 of summing circuits 93, 94 and 95, respectively, are fed to the three inputs of summing circuit 99, which is identical to summing circuits 93, 94 and 95. For each particular position of switch S2', then, lead 96 from summing circuit 93 contains a voltage representative of the extent to which the f1 component of the ultrasonic wave reflected from the unknown flaw matches the f1 stored information for the particular known flaw configuration selected by switch S2'. Similiarly, leads 97 and 98 contain the same information for the f2 and f3 components, respectively. Output lead 100 from summing circuit 99 contains, at any instant, a voltage representing the sum of all of the deviations indicated by the nine separate comparisons of the flaw-reflected beam with information stored with respect to a particular one of the three flaws of known configuration, with the particular known flaw being determined, of course, by the instantaneous position of switch S2'. The smaller the output from summing circuit 99, the closer the match of the unknown flaw to the known configuration with which it is then being compared. Instead of using four separate summing circuits 93, 94, 95, and 99, the same result could be obtained by use of a single summing circuit with nine inputs, adapted to provide at its output the sum of the absolute values of the nine input voltages.

Output lead 100 of summing circuit 99 is fed to the input of threshold device 101. Threshold device 101 may be any electronic device or circuit, well known in the art, which is adapted to provide an output signal of one type when its input is below a preselected threshold, and to provide an output signal of another type when its input exceeds the preselected threshold. The output signals of the threshold device are used to operate single pole, double throw switch S5, as indicated by the dashed line connection. Switch S5 and its connection to threshold device 101 are shown schematically; actually switch S5 itself would preferably be some type of electronic switching device. Threshold device 101 and switch S5 are so interconnected that when the input signal on lead 100 is above, or in excess of, the preselected threshold, switch S5 occupies the position shown in FIG. 5; and when the input on lead 100 falls below the preselected threshold, indicating a sufficient matching of the unknown flaw to the particular one of the known flaws to which it is then being compared, switch S5 is thrown to its other position.

The preselected threshold of threshold device 101, which is preferably adjustable, is set so that any signal which is not in excess of the threshold will indicate a close enough match for the purposes of the test situation, and any signal exceeding the threshold will indicate that the unknown flaw is not close enough to the known flaw it is being compared with.

As long as the input to threshold device does not indicate that an unknown flaw exists which matches one of the known configurations, switch S5 remains in its position as shown in FIG. 5, supplying power from source 84 to constantly and continuously cycle electronic switch S2' through the three switch positions. While the switch arm of switch section S2′k will be continuously cycling along with the other nine switch arms of switch S2′, there will be no indication upon flaw type indicator 60, because there will be no power applied thereto. As soon, however, as the input to threshold device 101 indicates the presence of a matching flaw by falling below the preselected threshold, device 101 throws switch S5 to its other position. This stops the electronic switch, and all of the arms of the ten sections will be stopped upon that particular contact connected to the matching known flaw. Upon the throwing of switch S5 to its alternate position, power is supplied through switch section S2′k to the appropriate lamp of flaw type indicator 60, thus indicating to the operator the nature of the flaw which has been discovered in pipe 11.

Summarizing the operation of the system shown in FIG. 5, pipe 11 to be inspected is moved longitudinally past the transducers while weld 10 is continuously interrogated by an ultrasonic wave of frequency components f1, f2 and f3 from transmitting transducer T. Electronic switch S2′ is continuously cycling. When sufficient reflected energy incident upon any of the receiving transducers indicates the presence of a flaw, lamp 91 lights and the motion of pipe 11 is immediately stopped by the opening of switch S4. If the discovered flaw in weld 10 is sufficiently close in configuration to any of the three flaws of known type whose characteristics are stored by the system, electronic switch S2′ stops upon the set contacts corresponding to the appropriate known flaw, and the correspondingly labeled one of lamps 81, 82 or 83 in flaw-type indicator 60 lights. If the discovered flaw does not match any of the known flaws closely enough (with the required closeness of match being determined by the threshold setting in threshold device 101), then switch S2′ continues to cycle and none of the lamps in indicator 60 are lit.

Obviously, the embodiment shown in FIG. 5 provides a much faster flaw indication and analysis system than does the rudimentary system of FIG. 4, and one more adapted to production type requirements. It does not, of course, provide the detailed information on each particular comparison point which is available from meters 77, 78 and 79 of the FIG. 4 embodiment, since the FIG. 5 embodiment does not include these meters. This information could be obtained from the FIG. 5 embodiment, however, by connecting oscilloscopes or other suitable recording equipment to the outputs of each of the comparator channels.

While the analysis systems of FIGS. 4 and 5 as shown and described use voltage comparison, the systems are obviously not dependent upon such a use, and the information on the known flaws may be stored in terms of any desired parameter, with the receiving transducer outputs converted to a like parameter for purposes of comparison.

The various configurations have been described in connection with use as "flaw" indicating and analysis systems. None of the systems herein described, however, are limited to such a use; with appropriate alterations in the positions of the transducers they may be used for the detection and analysis of any anomaly in a generally homogeneous medium, as long as it provides sufficient reflection of incident ultrasonic vibrational waves.

The number of frequencies used, the number of receiving transducers, and the number of known flaws whose information is stored, shown in the various embodiments of this application, have been limited in the figures and in the description for purposes of convenience; obviously any or all of these may be greatly increased in number in a practical testing system in accordance with the requirements of the system.

Various changes and alterations in the flaw analysis systems described herein which will suggest themselves to those skilled in the art are contemplated as being within the scope of this invention, which is defined solely by the claims.

What is claimed is:
1. The method of determining the configuration of a flaw at a predetermined location in a solid part, said flaw having an appreciable dimension extending in a direction generally parallel to a known plane, comprising the steps of:
   directing a continuous ultrasonic wave of a predetermined beam width and of constant frequency and strength towards said flaw from a transmitting location at an angle of incidence other than normal to said plane; and
   sensing the ultrasonic wave reflected by said flaw at a plurality of receiving locations spaced from said transmitting location predetermined distances functionally related to the location of said flaw and the incident angle of said ultrasonic wave directed toward said flaw, said receiving locations being spaced within and widthwise the beam path of said reflected wave; and
   determining the reflected beam path pattern of said reflected wave by detecting and measuring the magnitudes of the energy in the reflected beam pattern at said plurality of spaced receiving points,
   whereby a relatively flat flaw results in a relatively narrow beam pattern and a flaw having a contoured interface results in a relatively broad beam pattern.

2. The method of claim 1 including the additional step of:
   indicating for visual observation said reflected beam pattern by indicating said magnitudes of energy for each of the plurality of spaced receiving points.

3. The method of claim 1, wherein said measuring the magnitude of energy at said plurality of spaced points is performed simultaneously by a plurality of detectors located at said points.

4. The method of claim 1, wherein the beam pattern is determined by measuring the magnitudes of the energy in the reflection path at a first point located substantially at the center of said reflection path and at least a second point spaced therefrom at a predetermined location.

5. The method of claim 1 including the additional step of:
   comparing the magnitudes of the energy in the reflection path at said plurality of spaced points with the magnitudes of energy for corresponding spaced points of a beam pattern associated with a flaw of known configuration and generating an output signal indicative thereof.

6. The method of claim 1 including the additional steps of:
   comparing the magnitudes of the energy in the reflection path at said plurality of spaced points with the magnitudes of energy for corresponding spaced points of a beam pattern associated with a first flaw of known configuration and generating an output signal indicative thereof; and
   comparing the magnitudes of the energy in the reflection path at said plurality of spaced points with the magnitudes of energy for corresponding spaced points of a beam pattern associated with a second flaw of known configuration and generating an output signal indicative thereof.

7. The method of determining the configuration of a flaw at a predetermined location in a solid part, said flaw having an appreciable dimension extending in a direction generally parallel to a known plane comprising the steps of:
   directing a continuous ultrasonic wave of a predetermined beam width and of constant frequency and strength toward said flaw from a transmitting location at an angle of incidence other than normal to said plane; and
   sensing the ultrasonic wave reflected by said flaw at a plurality of receiving locations spaced from said transmitting location predetermined distances functionally related to the location of said flaw and the incident angle of said ultrasonic wave directed toward said flaw, said receiving locations being spaced within and widthwise of the beam path of said reflected wave; and determining the reflected beam pattern of the reflected wave of said first frequency by detecting and measuring the magnitudes of the energy in the reflection path at said plurality of spaced points, subsequently directing a continuous ultrasonic wave of a second constant frequency and of constant strength toward said region from said given transmitting point at said first transmitting angle of incidence; and determining the reflected beam pattern of the reflected wave of said second frequency by detecting and measuring the magnitudes of the energy in the reflection path at said plurality of spaced points, whereby the configuration of said flaw from which said waves are reflected is indicated by the nature of the strength of said reflected beam patterns of said first and second frequencies.

8. The method of claim 7 including the additional step of:

indicating for visual observation said reflected beam patterns of said first and second frequencies by indicating said magnitudes of energy for each of the plurality of spaced receiving points.

9. The method of claim 7, wherein said measuring the magnitudes of energy at said plurality of spaced points is performed simultaneously by a plurality of detectors located at said points.

10. The method of claim 7 including the additional step of:

for said first and second frequencies, comparing the magnitudes of the energy in the reflection path at said plurality of spaced points with the magnitudes of energy for corresponding spaced points of first and second frequency beam patterns associated with a flaw of known configuration and generating an output signal indicative thereof.

11. The method of determining the configuration of a flaw at a predetermined location in a solid part, said flaw having an appreciable dimension extending in a direction generally parallel to a known plane comprising the steps of:

directing a continuous ultrasonic wave of a predetermined beam width comprising a composite of a plurality of known fixed frequencies at constant strengths and toward said flaw from a transmitting location at an angle of incidence other than normal to said plane; and sensing the ultrasonic wave reflected by said flaw at a plurality of receiving locations spaced from said transmitting location predetermined distances functionally related to the location of said flaw and the incident angle of said ultrasonic wave directed toward said flaw, said receiving locations being spaced within and widthwise of the beam path of said reflected wave; and determining the reflected beam pattern of the reflected wave of each frequency component corresponding to a separate one of said plurality of frequencies by detecting and measuring the magnitudes of the energy of each frequency component at said plurality of spaced points in the reflection path, whereby the configuration of said flaw from which said wave is reflected is indicated by the nature of the strength of said reflected beam patterns of said plurality of frequencies.

12. The method of claim 11 including the additional step of:

for said plurality of frequencies, comparing the magnitudes of the energy in the reflection path at said plurality of spaced points with the magnitudes of energy for corresponding spaced points of corresponding frequency beam patterns associated with a flaw of known configuration and generating an output signal indicative thereof.

13. The method of claim 11 including the additional steps of:

for said plurality of frequencies, comparing the magnitudes of the energy in the reflection path at said plurality of spaced points with the magnitudes of energy for corresponding spaced points of corresponding frequency beam patterns associated with a first flaw of known configuration generating an output signal indicative thereof; and for said plurality of frequencies, comparing the magnitudes of the energy in the reflection path at said plurality of spaced points with the magnitudes of energy for corresponding spaced points of corresponding frequency beam patterns associated with a second flaw of known configuration and generating an output signal indicative thereof.

14. Apparatus for determining the configuration of a flaw at a predetermined location in a solid part, said flaw having an appreciable dimension extending in a direction generally parallel to a known plane comprising a transmitting transducer located for directing a wave of a predetermined beam width toward said flaw at an angle of incidence other than normal to said plane and to said flaw;

an oscillator connected to said transducer for the driving thereof at a constant frequency and strength;

a first receiving transducer spaced from said transmitting transducer a predetermined distance functionally related to the angle of incidence of said wave directed toward said flaw and located substantially in the center of the beam path of the reflected wave;

a second receiving transducer spaced a predetermined distance from said first receiving transducer and located within the beam path of the reflected wave and to one side of the center of said beam path;

indicating circuits connected to each of said receiving transducers for indicating the magnitudes of the energy detected thereby, an indication of the same relative magnitude by each indicating circuit indicating a contoured flaw interface and an indication that the magnitude of the energy detected by said first receiving transducer is appreciably greater than the magnitude of the energy detected by said second receiving transducer indicating a relatively flat flaw interface.

15. Apparatus for determining the configuration of a flaw at a predetermined location in a solid part, said flaw having an appreciable dimension extending in a direction generally parallel to a known plane comprising a transmitting transducer located for directing a wave of a predetermined beam width toward said flaw at an angle of incidence other than normal to said plane and to said flaw;

an oscillator connected to said transducer for the driving thereof at a constant frequency and strength;

a first receiving transducer spaced from said transmitting transducer a predetermined distance functionally related to the angle of incidence of said wave directed toward said flaw and located substantially in the center of the beam path of the reflected wave;

a second receiving transducer spaced a predetermined distance from said first receiving transducer and located within the beam path of the reflected wave and to one side of the center of said beam path;

a differential indicating circuit connected to said first and second receiving transducers for measuring the difference in the magnitude of the energy received by said first and second receiving transducers, a small difference indication revealing a broad reflected beam pattern and a large difference indication revealing a narrow reflected beam pattern.

16. Apparatus in accordance with claim 15 and including
- a switch between said oscillator and said transmitting transducer; and
- at least a second oscillator operating at a different constant frequency and strength than said first-named oscillator;
- said second oscillator connected to said switch for connection to said transmitting transducer at a different setting thereof than the setting that connects said first-named oscillator to said transmitting transducer.

17. Apparatus for determining the configuration of a flaw at a predetermined location in a solid part, said flaw having an appreciable dimension extending in a direction generally parallel to a known plane comprising
- a transmitting transducer located for directing a wave of a predetermined beam width toward said flaw at an angle of incidence other than normal to said plane and to said flaw;
- an oscillator connected to said transducer for the driving thereof at constant frequency and strength;
- a first receiving transducer spaced from said transmitting transducer a predetermined distance functionally related to the angle of incidence of said wave directed toward said flaw and located substantially in the center of the beam path of the reflected wave;
- a second receiving transducer spaced a predetermined distance from said first receiving transducer and located within the beam path of the reflected wave and to one side of the center of said beam path;
- a first detection circuit connected to said first receiving transducer for detecting the component at the frequency of said oscillator from the received wave, and producing an output indicative of the magnitude of the energy of said frequency component detected,
- a first storage element having the magnitude of energy stored therein corresponding to that received by a transducer correspondingly located to said first receiving transducer with respect to a flaw of known configuration and operated in conjunction with a corresponding transmitting transducer and oscillator;
- a first comparator connected to said first detection circuit and said first storage element for giving an output signal indicative of the difference in the energies applied thereto;
- a second detection circuit connected to said second receiving transducer for detecting the component at the frequency of said oscillator from the received wave, and producing an output indicative of the magnitude of the energy of said frequency component detected,
- a second storage element having the magnitude of energy stored therein corresponding to that received by a transducer correspondingly located to said second receiving transducer with respect to a flaw of known configuration and operated in conjunction with a corresponding transmitting transducer and oscillator;
- a second comparator connected to said second detection circuit and said second storage element for giving an output signal indicative of the difference in the energies applied thereto;
- indicator means for selectively giving a visual indication in accordance with the applied signal from said first comparator and with the applied signal from said second comparator.

18. Apparatus in accordance with claim 17, and including
- another oscillator connected to said transmitting transducer for the driving thereof at a known, fixed frequency different from the operating frequency of said first-named oscillator and at a constant strength,
- a third detection circuit connected to said first receiving transducer for detecting the component at the frequency of said another oscillator from the received wave, and producing an output indicative of the magnitude of the energy of said frequency component detected,
- a third storage element having the magnitude of energy stored therein corresponding to that received by a transducer correspondingly located to said first receiving transducer with respect to a flaw of known configuration and operated in conjunction with a corresponding transmitting transducer and another oscillator;
- a third comparator connected to said third detection circuit and said third storage element for giving an output signal indicative of the difference in the energies applied thereto;
- a fourth detection circuit connected to said second receiving transducer for detecting the component at the frequency of said another oscillator from the received wave, and producing an output indicative of the magnitude of the energy of said frequency component detected,
- a fourth storage element having the magnitude of energy stored therein corresponding to that received by a transducer correspondingly located to said second receiving transducer with respect to a flaw of known configuration and operated in conjunction with a corresponding transmitting transducer and another oscillator;
- a fourth comparator connected to said fourth detection circuit and said fourth storage element for giving an output signal indicative of the difference in the energies applied thereto;
- a first indicator circuit for giving a visual indication in accordance with an applied signal;
- a second indicator circuit for giving a visual indication in accordance with an applied signal; and
- a switch for applying successively the outputs from said first and second comparators to said first indicator circuit and for applying successively the outputs from said third and fourth comparators to said second indicator circuit.

19. Apparatus in accordance with claim 17 and including
- means for effecting relative movement between said transmitting and receiving transducers and said region; and
- switch means for disconnecting said means for effecting relative movement when an output from said first or second detection circuit exceeds a predetermined threshold level.

20. Apparatus for determining the configuration of a flaw at a predetermined location in a solid part, said flaw having an appreciable dimension extending in a direction generally parallel to a known plane comprising
- a transmitting transducer located for directing a wave of a predetermined beam width toward said flaw at an angle of incidence other than normal to said plane and to said flaw;
- an oscillator connected to said transducer for the driving thereof at a constant frequency and strength;
- a first receiving transducer spaced from said transmitting transducer a predetermined distance functionally related to the angle of incidence of said wave directed toward said flaw and located substantially in the center of the beam path of the reflected wave;
- a second receiving transducer spaced a predetermined distance from said first receiving transducer and located within the beam path of the reflected wave and to one side of the center of said beam path;
- a first detection circuit connected to said first receiving transducer for detecting the component at the frequency of said oscillator from the received wave, and producing an output indicative of the magnitude of the energy of said frequency component detected, a first storage element having the magnitude of energy stored therein corresponding to that received by a transducer correspondingly located to said first receiving transducer with respect to a flaw of known configuration and operated in conjunction with a corresponding transmitting transducer and oscillator;

a first comparator connected to said first detection circuit and said first storage element for giving an output signal indicative of the difference in the energies applied thereto;

a second detection circuit connected to said second receiving transducer for detecting the component at the frequency of said oscillator from the received wave, and producing an output indicative of the magnitude of the energy of said frequency component detected, a second storage element having the magnitude of energy stored therein corresponding to that received by a transducer correspondingly located to said second receiving transducer with respect to a flaw of known configuration and operated in conjunction with a corresponding transmitting transducer and oscillator;

a second comparator connected to said second detection circuit and said second storage element for giving an output signal indicative of the difference in the energies applied thereto;

a third storage element having the magnitude of energy stored therein corresponding to that received by a transducer correspondingly located to said first receiving transducer with respect to another flaw of known configuration different from that of said first-named flaw and operated in conjunction with a corresponding transmitting transducer and oscillator;

a third comparator connected to said first detection circuit and said third storage element for giving an output signal indicative of the difference in the energies applied thereto;

a fourth storage element having the magnitude of energy stored therein corresponding to that received by a transducer correspondingly located to said second receiving transducer with respect to said another flaw of known configuration and operated in conjunction with a corresponding transmitting transducer and oscillator;

a fourth comparator connected to said second detection circuit and said fourth storage element for giving an output signal indicative of the difference in the energies applied thereto;

a first indicator for giving a visual indication in accordance with an applied signal;

a second circuit for giving a visual indication in accordance with an applied signal;

a switch for applying successively the outputs from said first and second comparators to said first indicator circuit and for applying successively the outputs from said third and fourth comparators to said second indicator circuit.

21. Apparatus for determining the configuration of a flaw at a predetermined location in a solid part, said flaw having an appreciable dimension extending in a direction generally parallel to a known plane comprising a transmitting transducer located for directing a wave of a predetermined beam width toward said flaw at an angle of incidence other than normal to said plane and to said flow;

means connected to said transducer for the driving thereof at a plurality of known, fixed frequencies of constant strength;

a first receiving transducer spaced from said transmitting transducer a predetermined distance functionally related to the angle of incidence of said wave directed toward said flaw and located substantially in the center of the beam path of the reflected wave;

a plurality of receiving transducers spaced a predetermined distance from said first receiving transducer and located within the beam path of the reflected wave and to one side of the center of said beam path;

a plurality of detection circuits connected to each of said receiving transducers, each of said circuits tuned for the detection of a different one of the frequency components from the received wave corresponding to the frequency components from the transmitting transducer, each of said circuits producing an output indicative of the magnitude of the energy of the frequency component detected;

a plurality of storage elements, each element having the magnitude of energy stored therein corresponding to that received by a plurality of transducers correspondingly located to said receiving transducers with respect to a plurality of flaws of known configuration and operated in conjunction with a corresponding transmitting transducer and driving means therefor;

a plurality of comparators connected to said detection circuits and corresponding storage elements for giving output signals indicative of the difference in the energies applied thereto for each receiving transducer for each detected frequency component and for each flaw configuration for which information is stored;

a plurality of indicator circuits for each receiving transducer and for each frequency for giving a visual indication in accordance with an applied signal; and switch means for successively applying to said indicator circuits the outputs from said comparators for each flaw configuration for which information is stored.

22. Apparatus in accordance with claim 21 and including means for effecting relative movement between said transmitting and receiving transducers and said region; and switch means for disconnecting said means for effecting relative movement when an output from any of said detection circuits exceeds a predetermined threshold level.

23. Apparatus for determining the configuration of a flaw at a predetermined location in a solid part, said flaw having an appreciable dimension extending in a direction generally parallel to a known plane comprising a transmitting transducer located for directing a wave of a predetermined beam width toward said flaw at an angle of incidence other than normal to said plane and to said flaw;

means connected to said transducer for the driving thereof at a plurality of known, fixed frequencies of constant strength;

a first receiving transducer spaced from said transmitting transducer a predetermined distance functionally related to the angle of incidence of said wave directed toward said flaw and located substantially in the center of the beam path of the reflected wave;

a plurality of receiving transducers spaced a predetermined distance from said first receiving transducer and located within the beam path of the reflected wave and to one side of the center of said beam path;

a plurality of detection circuits connected to each of said receiving transducers, each of said circuits tuned for the detection of a different one of the frequency components from the received wave corresponding to the frequency components from the transmitting transducer, each of said circuits producing an output indicative of the magnitude of the energy of the frequency component detected;

a plurality of storage elements, each element having the magnitude of energy stored therein corresponding to that received by a plurality of transducers correspondingly located to said receiving transducers with respect to a plurality of flaws of known configuration and operated in conjunction with a corresponding transmitting transducer and driving means therefor;

a plurality of comparators connected to said detection circuits and suitable for connection to corresponding storage elements for giving output signals indicative of the difference in the energies applied thereto for each receiving transducer for each detected frequency component and for each flaw configuration for which information is stored;

a plurality of summing circuits, each one of which summing circuits is connected to the output of the comparators that determine signal differences for the same frequency and same flaw configuration, said summing circuits detecting the total applied energies therefrom;

another summing circuit connected to each of the summing circuits in said plurality thereof; and a plurality of indicating circuits for each flaw configuration for which information is stored for giving a visual indication in accordance with an applied signal; and switch means for successively applying to said indicator circuits the output from said another summing circuit while simultaneously successively selecting storage elements for each flaw configuration for which information is stored for application to said comparators.

24. Apparatus in accordance with claim 23, and including threshold detection means connected to the output of said another summing circuit for detecting an applied signal below a preset level;

means for effecting relative movement between said transmitting and receiving transducers and the region being interrogated;

switch means for disconnecting said means for effecting said relative movement when the output of said another summing circuit to said threshold level detector falls below a predetermined threshold level; and indicating means for visually indicating when said output level of said another summing circuit falls below said predetermined threshold level.

25. The method of claim 7 including the additional steps of:

for said first and second frequencies, comparing the magnitudes of the energy in the reflection path at said plurality of spaced points with the magnitudes of energy for corresponding spaced points of first and second frequency beam patterns associated with a first flaw of known configuration; and for said first and second frequencies, comparing the magnitudes of the energy in the reflection path at said plurality of spaced points with the magnitudes of energy for corresponding spaced points of first and second frequency beam patterns associated with a second flaw of known configuration.

26. The method of claim 7, wherein the beam pattern is determined by measuring the magnitudes of the energy in the reflection path at a first point located substantially at the center of said reflection path and at least a second point spaced therefrom at a predetermined location.

27. The method of claim 11, wherein said measuring the magnitudes of energy at said plurality of spaced points is performed simultaneously by a plurality of detectors located at said points.

28. The method of claim 11, wherein the beam pattern is determined by measuring the magnitudes of the energy in the deflection path at a first point located substantially at the center of said reflection path and at least a second point spaced therefrom at a predetermined location.

29. The method of claim 11, including the additional step of:

indicating for visual observation said reflected beam patterns of each frequency component of said composite of a plurality of frequencies by indicating said magnitudes of energy for each of the plurality of spaced receiving points.

References Cited

UNITED STATES PATENTS

| | | | |
|---|---|---|---|
| 2,803,129 | 8/1957 | Bradfield | 73—67.8 |
| 2,848,891 | 8/1958 | Hunter et al. | 73—67.5 |
| 3,174,127 | 3/1965 | Haslett. | |

OTHER REFERENCES

McMaster, Robert C.: Nondestructive Testing Handbook, The Ronald Press Co., N.Y. 1959, sec. 45, pp. 18–27, TA 410 M 32 C.2 in Group 430.

Gericke, O. R.: Determination of the Geometry of Hidden Defects by Ultrasonic Pulse Analysis Testing. The Journal of the Acoustical Society of America, vol. 35, No. 3, March 1963, pp. 364–368. A copy is in Group 430, 73–67.8.

JAMES J. GILL, *Primary Examiner.*

RICHARD C. QUEISSER, *Examiner.*

J. P. BEAUCHAMP, *Assistant Examiner.*